(12) United States Patent
Nyssen

(10) Patent No.: US 6,646,023 B1
(45) Date of Patent: Nov. 11, 2003

(54) SOLID PIGMENT PREPARATION FOR COLORING SEED/SEED-DRESSING MATERIALS

(75) Inventor: Peter-Roger Nyssen, Dormagen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 108 days.

(21) Appl. No.: 09/704,882

(22) Filed: Nov. 2, 2000

(30) Foreign Application Priority Data

Nov. 12, 1999 (DE) .......................... 199 54 401

(51) Int. Cl.⁷ .............................. C08K 5/56; C08K 3/10
(52) U.S. Cl. ........................... 523/122; 427/4; 524/413; 524/431; 524/434; 524/447; 524/492; 524/8
(58) Field of Search .............................. 523/122; 427/4; 524/413, 431, 88, 434, 447, 492

(56) References Cited

U.S. PATENT DOCUMENTS

| | | | |
|---|---|---|---|
| 4,258,074 A | 3/1981 | Grimm et al. | 427/4 |
| 4,272,417 A | 6/1981 | Barke et al. | 260/22 R |
| 5,137,747 A | 8/1992 | Malandain et al. | 427/4 |
| 5,681,876 A | 10/1997 | Schneider et al. | 523/351 |
| 5,697,984 A | 12/1997 | Swatzina et al. | 8/527 |
| 5,950,360 A | 9/1999 | Heinrich et al. | 47/58.1 |
| 6,077,339 A | 6/2000 | Nyssen et al. | 106/31.77 |

FOREIGN PATENT DOCUMENTS

| | | |
|---|---|---|
| CA | 1046176 | 1/1979 |
| CA | 1251653 | 3/1989 |
| EP | 789987 | 8/1997 |
| FR | 2777421 | 10/1999 |
| WO | 93/14158 | 7/1993 |
| WO | 98/18311 | 5/1998 |
| WO | 99/29169 | 6/1999 |
| WO | 00/25568 | 5/2000 |

*Primary Examiner*—Kriellion A. Sanders
(74) *Attorney, Agent, or Firm*—Godfried R. Akorli; Diderico van Eyl

(57) ABSTRACT

The invention relates to a method of coloring seed, seed-dressing materials, or seed-dressing material formulations with solid pigment preparations containing (a) at least one organic or inorganic pigment and
(b) at least one compound selected from the group consisting of polyether polyols, reaction products of alkylene oxides with alkylatable compounds, or oxalkylated phenols, wherein the solid pigment preparations have a water content of less than 10% by weight, based on the pigment preparation, and a mean weight average particle size of 20 to 2000 $\mu$m.

6 Claims, No Drawings

SOLID PIGMENT PREPARATION FOR COLORING SEED/SEED-DRESSING MATERIALS

BACKGROUND OF THE INVENTION

The invention relates to the use of solid pigment preparations as colorants for coloring seed and seed-dressing materials.

Seed dressing constitutes a widely used form of treating plants with pesticides. Pesticides are understood as meaning, in particular, herbicides, insecticides, fungicides and other crop protection agents.

Nowadays, seed is treated with pesticides in seed-treatment plants in which the pesticides are usually in the form of a "formulation" when mixed with the seed. Suitable mixing methods are, for example, "pelleting", granulation, or encrusting, during which process either preformulated seed dressing products are applied to the seed in the form of a coating or individual formulation components are applied immediately prior to or during the mixing process. The active ingredients (i.e., pesticides) are generally present in the seed-dressing formulations as solids which are employed, for example, in the form of their wettable powders or granules, aqueous suspensions or emulsions, or suspensions or emulsions that are miscible with water.

The seed-dressing formulations may additionally also contain inorganic or organic binders (for example, film-forming polymers that are miscible with water, surfactants, biocides, thickeners, protective colloids, or antifoams). Usually, however, they additionally contain a colorant, particularly an inorganic or organic color pigment. The purpose of such colorants is to mark or distinguish between certain types of seed by color, to protect the seed from feeding damage by birds, to improve the stability of the formulation formula, or else to serve as filler. The pigments are used either in the form of pigment powders or in the form of liquid, in general water-based, preparations.

The use of red aqueous pigment preparations is described in Examples 1 and 2 of WO-A 99/29169 and the use of inorganic iron oxide pigment powder is described in Example 2 of EP-A-1 3 769.

The colorants (pigments) can be added to preformulated seed-dressing products or added to the seed before or during the mixing process, together with the other formulation components. Customary pigment powders have the disadvantage that the pigment particles are still greatly aggregated or agglomerated, so that complete wetting and dispersion of the pigments during the mixing process is frequently unsuccessful. The great evolution of dust during handling is also disadvantageous.

While, in principle, aqueous (predispersed) pigment preparations permit a more intensive coloring, they lead to an undesired dilution of the seed-dressing products and are therefore suitable for industrial application only to a limited extent. Moreover, they are more complicated with regard to packaging and transport and require specific provision in order to be sufficiently storage-stable (preservation, prevention of drying out, antifreeze protection, and the like). Frequently—for example, in the case of C.I. Pigment Red—aqueous preparations of the prior art show a pronounced tendency to thickening and thus lack storage stability.

There is therefore a desire for new, readily dispersible highly concentrated pigment preparations that may be used in all seed-treatment product application methods and that overcome the disadvantages described above and are economical to produce. In particular, there is a need for pigment preparations in the hue ranges red, blue, green, and white.

Solid pigment preparations are already known in other fields of industrial application, such as, for example, for pigmenting building materials, renderings, and dispersion paints.

DE-A 19 523 204 and DE-A 2 608 993 describe pigment preparations in powder form, as well as processes for their preparation, that are characterized by the use of film formers or protective colloids that are very readily soluble in water (such as, for example, those based on polyvinyl alcohol/vinyl alcohol mixtures, vinyl alcohol copolymers, or polymers of N-vinylpyrrolidone) in addition to pigment and dispersant in order to ensure the good dispersability of the preparations in the aqueous media in which they are used. However, such film formers are undesirable in formulation formulas for seed-dressing materials since they have a thickening effect in the formulas—also as a result of the large quantity that is required—or may undergo other adverse interactions with seed-dressing product components.

Another disadvantage of solid, as well as liquid, pigment preparations comprising organic film formers or protective colloids is that they reflocculate in the aqueous media in which they are used in the course of prolonged mixing times, lose color intensity, and in most cases also change the hue. This applies very particularly to preparations based on copper phthalocyanine pigments and pigments based on laked colorants, which are already widely used in the field of seed-dressing materials in their powder form. Liquid pigment preparations that are based on laked colorants, such as, for example, Colour Index Pigment Red 48:2, and that have been produced in accordance with the prior art additionally have the disadvantage of lacking storage stability with regard to viscosity and coloristic.

There is therefore a need for readily redispersible pigment preparations having improved storage stability and high pigment content without the abovementioned disadvantages of solid pigment preparations of the prior art.

SUMMARY OF THE INVENTION

The invention therefore relates to a method comprising coloring (color pigmentation) seed, seed-dressing materials, or seed-dressing material formulations (preferably aqueous ones) with solid pigment preparations comprising
  (a) at least one organic or inorganic pigment and
  (b) at least one compound selected from the group consisting of polyether polyols, reaction products of alkylene oxides with alkylatable compounds (such as fatty alcohols, fatty amides, fatty acids, phenols, alkylphenols, carboxamides, and resin acids), or oxalkylated phenols (particularly phenol/styrene polyglycol ethers),
wherein the solid pigment preparations have a water content of less than 10% by weight (preferably less than 3% by weight), based on the pigment preparation, and a mean weight average particle size of 20 to 2000 $\mu$m (preferably 50 to 1000 $\mu$m and more preferably 80 to 500 $\mu$m) and are preferably obtained without the addition of organic protective colloids or film formers.

The solid pigment preparations are preferably obtained in the form of readily flowable, low-dust granules by spray-drying methods.

DETAILED DESCRIPTION OF THE INVENTION

The organic or inorganic pigments of component (a) are not subject to any limitation.

Examples of suitable pigments are those known from the prior art as can be seen, for example, in: Lückert, Pigment+Füllstoff Tabellen [Pigment+Filler Tables], 5th edition, Laatzen, 1994. These materials are insoluble in aqueous media.

Examples of suitable inorganic pigments are white and color pigments.

Inorganic white pigments that may be mentioned are, in particular, oxides such as, for example, titanium dioxide, zinc oxide (ZnO, zinc white), zirconium oxide; carbonates such as, for example, lead white; sulfates such as, for example, lead sulfate; and sulfides such as, for example, zinc sulfide, and lithopones. Titanium dioxide is especially preferred.

Inorganic color pigments that may be mentioned are pigments from the group of oxides and hydroxides as their inorganic individual compounds or as mixed phases, in particular iron oxide pigments, chromium oxide pigments, and oxidic mixed-phase pigments with rutile or spinel structure, and bismuth vanadate, cadmium, cerium sulfide, chromate, ultramarine, and iron blue pigments.

Example of iron oxide pigments are Colour Index Pigment Yellow 42, Pigment Red 101, Pigment Blue 11, Pigment Brown 6, and transparent iron oxide pigments.

Examples of chromium-oxide pigments are Colour Index Pigment Green 17 and Pigment Green 18.

Examples of oxidic mixed-phase pigments are nickel titanium and chromium titanium yellow, cobalt green and cobalt blue, zinc iron brown and chromium iron brown, and iron manganese black and spinel black. Iron oxide pigments, particularly red iron oxide pigments, are preferred.

Also preferred are carbon blacks, which are considered pigments for the purposes of the present application and of which a large number is known, for example, from Colour Index, 2nd edition. Carbon blacks that may be mentioned in particular are acidic and alkaline carbon blacks obtained by the furnace process and chemically surface-modified carbon blacks, for example sulfur- or carboxyl-containing carbon blacks.

Examples of preferred organic pigments are those of the monoazo, disazo, laked azo, β-naphthol, napthol AS, benzimidazolone, disazo condensation, azo metal complex, isoindoline, and isoindolinone series, as well as polycyclic pigments such as, for example, from the phthalocyanine, quinacridone, perylene, perinone, thioindigo, anthraquinone, dioxazine, quinophthalone, and diketopyrrolopyrrole series, and laked colorants such as Ca, Mg, and Al lakes of sulfur- or carboxyl-containing colorants.

Especially preferred organic pigments are polycyclic pigments from the group of the optionally halogenated copper phthalocyanine pigments such as, for example, those of Colour Index Pigment Blue 15, 15:1, and 15:3, Pigment Green 7 and Pigment Green 36, and of the anthraquinone pigments, particularly from the series of the heterocyclic and polycarbocyclic anthraquinone pigments.

Also preferred are metal salts of sulfo- and/or carboxyl-containing monoazo pigments such as β-naphthol pigments, naphthol-AS pigments, and naphthalenesulfonic acid pigments, or 2-hydroxy-3-naphthalene-sulfonic acid, which also come within the term "laked azo pigments".

Inorganic fillers are equally considered pigments for the purposes of the present application.

Examples of inorganic fillers that may be mentioned are calcium carbonate, talc, mica, and barium sulfate.

Suitable compounds from the group of the polyether polyols are preferably homopolymers, copolymers, or block copolymers of ethylene oxide and/or propylene oxide, which are preferably prepared by reacting ethylene oxide and/or propylene oxide with water or with low-molecular-weight alcohols having at least two hydroxyl groups, such as, for example, ethylene glycol, propylene glycol, 1,2- or 1,3-propanediol, 1,2- or 1,4-butanediol, hexanediol, glycerol, or pentaerythritol, or with low-molecular weight amines that carry at least two amino groups with reactive hydrogen atoms, such as ethylenediamine. Preferred polyether polyols are polyalkylene glycols that have a mean numeric average molecular weight of 200 to 11,000, in particular 250 to 4000, especially preferably 250 to 1000 g/mol. Very especially preferred are polyethylene glycols and/or polypropylene glycols inclusive of tripropylene glycol.

Other preferred polyether polyols are block copolymers that are obtained by subjecting ethylene oxide and/or propylene oxide onto bifunctional alcohols or amines to a controlled, continuous polyaddition reaction, particularly block copolymers of the abovementioned type that are soluble in or miscible with water, such as those known under the names Pluronic® or Tetronic®.

Suitable compounds from the group of the reaction products of alkylene oxides with alkylatable compounds are, in particular, surfactants based on fatty alcohols, fatty amines, fatty acids, phenols, alkyl phenols, carboxamides, and resin acids. They are, particularly, for example, ethylene oxide adducts from the class of the reaction products of ethylene oxide with (m) saturated and/or unsaturated fatty alcohols having 6 to 25 carbon atoms or (n) alkylphenols having 4 to 12 carbon atoms in the alkyl radical or (o) saturated and/or unsaturated fatty amides having 14 to 20 carbon atoms or (p) saturated and/or unsaturated fatty acids having 14 to 22 carbon atoms or (q) hydrogenated and/or unhydrogenated resin acids, (r) esterification and/or arylation products that have been produced from natural or modified, optionally hydrogenated, fatty substances from castor oil and that are optionally linked to give repeat units by esterification with dicarboxylic acid.

Preferred as component (b) are compounds from classes (m), (o) and (p), particularly ethylene oxide adducts of optionally hydrogenated castor oil with 10 to 100 molar units (preferably 15 to 80 molar units) of ethylene oxide.

Compounds from the group of the oxalkylated phenols, particularly in the form of optionally ionically-modified phenol/styrene polyglycol ethers, are disclosed in DE-A 19 644 077.

Phenol/styrene polyglycol ethers that are preferred are those of the formula (X)

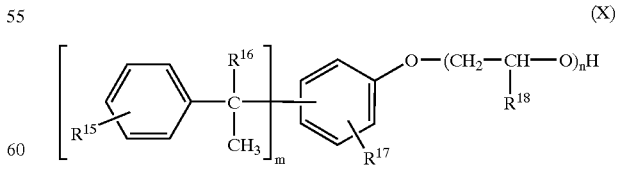

wherein $R^{15}$ is hydrogen or $C_1$–$C_4$-alkyl, $R^{16}$ is halogen or $CH_3$, $R^{17}$ is hydrogen, $C_1$–$C_4$-alkyl, $C_1$–$C_4$-alkoxy, $C_1$–$C_4$-alkoxycarbonyl, or phenyl, m is a number from 1 to 4, n is a number from 6 to 120, and $R^{18}$ is identical or different for each unit indicated by n and represents hydrogen, $CH_3$, or phenyl, with the proviso that if $CH_3$ is present in the various —(—$CH_2$—CH($R^{18}$)—O—)-groups, then $R^{18}$ represents $CH_3$ in 0 to 60% of the overall value of n and represents hydrogen in 100 to 40% of the overall value of n and, if phenyl is present in the various —(—$CH_2$—CH($R^{18}$)—O—)-groups, then $R^{18}$ represents phenyl in 0 to 40% of the overall value of n and represents hydrogen in 100 to 60% of the overall value of n.

Preferred ionically modified phenol/styrene polyglycol ethers (X) are those of the formula (XI)

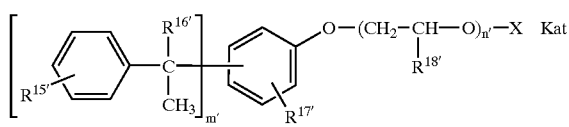

(XI)

wherein $R^{15'}$, $R^{16'}$, $R^{17'}$, $R^{18'}$, m' and n' adopt the scope of definition of $R^{15}$, $R^{16}$, $R^{17}$, $R^{18}$, m, and n, respectively, but independently thereof, X represents the group —$SO_3^-$, —$SO_2^-$, —$PO_3^-$, or —CO—($R^{19}$)—$COO^-$, Kat represents a cation from the group consisting of $H^+$, $Li^+$, $Na^+$, $K^+$, $NH_4^+$, or —HO—$CH_2CH_2$—$NH_4^+$, with the proviso that if X is —$PO_3^-$, then two Kat are present, and $R^{19}$ represents a divalent aliphatic or aromatic radical, preferably $C_1$–$C_4$-alkylene (particularly ethylene), $C_2$–$C_4$-monounsaturated radicals (especially acetylene), or optionally substituted phenylene (particularly ortho-phenylene in which possible substituents are preferably $C_1$–$C_4$-alkyl, $C_1$–$C_4$-alkoxy, $C_1$–$C_4$-alkoxycarbonyl, or phenyl).

The pigment preparations used in accordance with the invention may contain, as additional additives, agents conventionally used in pigment preparations, such as preservatives, UV stabilizers, pH regulators, softeners, and other surfactants, such as, for example, wetting or antifoam agents.

Suitable antifoams and foam preventatives are, in particular, products based on natural oils or mineral oils, optionally chemically modified alcohols, and chemically modified silicones.

Suitable water softeners are, for example, medium-to-high molecular weight polyphosphates, such as Calgon®.

In a particular embodiment, the pigment preparations used in accordance with the invention contain, as additional component (c), optionally hydrophobicized highly-disperse amorphous pyrogenic silicas, optionally hydrophobicized ultrafinely divided kaolin, and/or highly dispersed alumina. Preferably, component (c) has a specific surface [B.E.T. method] of 2 to 500 $m^2$/g, preferably 10 to 370 $m^2$/g.

Furthermore, the pigment preparations may additionally contain specific thickeners.

Suitable thickeners that may be mentioned are those from the group of anionic or nonionic organic water-soluble polymers that in the broader sense are also considered protective colloids for the solid pigment preparation. Especially preferred are organic thickeners that preferably have a solubility in water of >100 g/l.

A compound that is preferably employed as organic thickener is one whose 4% strength by weight aqueous solution has a viscosity of ≧2 mPa·s at 20° C.

Preferred organic thickeners are compounds selected from the following groups:

Dextrins or cyclodextrins,

Starch and starch derivatives, particularly degraded or partially degraded starch, Anionic polyhydroxy compounds, particularly xanthan or carboxymethylcellulose, Cellulose derivatives such as, for example, methyl cellulose, particularly hydroxymethyl, hydroxyethyl, or hydroxypropyl cellulose, Partially hydrolyzed vinyl acetate polymers, preferably polyvinyl alcohol that are hydrolyzed to over 70% and/or vinyl alcohol copolymers, preferably copolymers of vinyl acetate and alkylvinyl esters that are partially or fully hydrolyzed, and polyvinyl alcohol itself, Polymers of N-vinylpyrrolidone or copolymers with vinyl esters.

Thickeners that are preferably suitable are starch, derivatized starch, and, in particular, degraded starch.

Degraded starch is obtained, for example, by subjecting native potato, wheat, maize, rice, or tapioca starch to oxidative, thermal, enzymatic, or hydrolytic degradation. Preferred in this context are oxidatively degraded starches, especially preferably potato starch that has been oxidatively degraded with hypochlorite.

Other suitable materials are, in particular, dextrins and cyclodextrins. Dextrins that are preferably used are white dextrins, yellow dextrins, and maltodextrins having a solubility in cold water of greater than 50% by weight (preferably greater than 90%) measured at 10 g per 200 ml of water at 20° C.

Preferred cyclodextrins are those of the α-CD type with 6 gluco-pyranose units, of the β-CD type with 7 glucopyranose units, and of the γ-CD type with 8 glucopyranose units, as well as branched AB, AC, AD-diclosyl-CD type, and mixtures thereof.

Preferred suitable anionic polyhydroxy compounds are poly-saccharides, particularly xanthan, and carboxymethylcellulose.

Cellulose derivatives that can be employed as thickeners are preferably methylcellulose, hydroxymethylcellulose, and hydroxyethyl- and -propylcellulose.

Materials that are particularly suitable as thickeners are at least partially hydrolyzed polymers and copolymers of vinyl acetate that are fully dispersible, preferably fully soluble, in water. Preferred are hydrolyzed polymers and copolymers of vinyl acetate with a degree of hydrolysis of 70 to 97% (preferably 80 to 92%), a molecular weight (Mw) of 1000 to 150,000 g/mol (preferably 2000 to 100,000 g/mol), or a flow viscosity (in accordance with DIN 53 015) of a 4% strength by weight aqueous solution at 20° C. of 2 to 35 mPa·s (preferably 2 to 10 mPa·s). Flow viscosity is "Höppler" viscosity measured in accordance with DIN 53 015 as a 4% strength by weight solution at 20° C., using a falling-bowl viscometer.

Especially preferred are partially hydrolyzed polyvinyl alcohols, and polyvinyl alcohol itself.

Copolymers of vinyl acetate are taken to mean, as thickeners, preferably fully or partially hydrolyzed vinyl alcohol copolymers, particularly fully hydrolyzed copolymers of alkylvinyl esters and vinyl acetate having an alkylvinyl ester content of preferably 5 to 20 mol %, very especially copolymers of alkylvinyl acetate and vinyl acetate.

Other materials that are suitable as thickeners are homo- and copolymers of N-vinylpyrrolidone that disperse fully in water.

Advantageous thickeners are polymers that contain 35 to 100 mol % of repeat units of the general formula

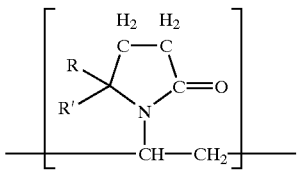

wherein R and R' are independently of one another H, methyl, or ethyl, and 0 to 65 mol % of one or more monoethylenically unsaturated comonomers, particularly vinyl esters such as vinyl acetate, acrylic esters such as ethyl acrylate, methacrylic esters such as methyl methacrylate, vinylalkyl esters such as vinyl cyclohexyl ether, vinyl halides such as vinyl chloride, vinylcaprolactam, vinylimidazol, allyl alcohol, acrylonitrile, styrene, vinylcarbazol, and others. If appropriate, the copolymers can be ionically modified (cationically or anionically).

The molecular weight ($M_w$) of the homo- and copolymers of N-vinylpyrrolidone ranges from 2000 to 1,200,000, preferably 10,000 to 150,000 g/mol.

Very especially preferred are homopolymers of N-vinylpyrrolidone, as well as copolymers with vinyl esters and Na methacrylate.

Based on preparations, the solid pigment preparations to be preferably used in accordance with the invention comprise (a) 30 to 99% by weight (preferably 60 to 95% by weight) of component (a) and (b) 1 to 100% by weight (preferably 5 to 60% by weight) of component (b) based on the pigment of component (a), wherein the solid pigment preparations have a water content of less than 10% by weight (preferably less than 3% by weight) and a mean particle size (ex mass distribution) of 20 to 2000 $\mu$m (preferably 50 to 1000 $\mu$m, particularly 80 to 500 $\mu$m).

The solid pigment preparations to be used in accordance with the invention can be prepared, for example, in such a manner that the inorganic or organic pigments or fillers of component (a) in solid form, preferably as finished or unfinished powders, granules, or water-moist filter cakes, are subjected to wet comminution in an aqueous or aqueous-organic medium together with at least some of component (b) and, if appropriate, component (c) and, if appropriate, other additives and the product is subsequently dried.

It is preferred to use in this context an aqueous medium that has a pH of 2 to 12, particularly 2 to 10. In general, a temperature of 0 to 95° C. (preferably 20 to 60° C.) is applied for the continuous or batchwise wet comminution. Wet comminution is to be understood as meaning, in the present context, homogenizing, grinding, or kneading. This process step converts pigments and/or fillers into a finely-divided state. If appropriate, the additives required can be added before, during, or after generating the finely-divided state. The choice of the methods for achieving the desired finely-divided state prior to drying depends on the aggregation or agglomeration state of the solids employed and on the required expenditure of energy for achieving the desired finely-divided state. Examples of methods that are suitable for organic and inorganic fillers and inorganic pigments are dissolvers, Ultraturrax or rotor-stator mills. Pigments that are aggregated to a greater degree, due to their preparation, suggest, for example, that finely-divided organic pigments, carbon black, and specific finely-divided inorganic oxide pigments can additionally require wet-grinding techniques with a higher specific energy input. This is provided, for example, by stirred-bowl mills and bead mills, dispersion kneaders, roller mills, or high-pressure homogenizers. If appropriate, the resulting aqueous pigment suspensions are subsequently brought to the consistency and composition desired for the subsequent drying step, using either more water or aqueous-organic medium or, if appropriate, other abovementioned additives.

Thereafter, the aqueous suspension is preferably converted into the solid pigment preparation by drying. A suitable method for drying is, in particular, spray drying, especially single-material spray drying using high-pressure nozzles or spiral chamber nozzles, or plate spray drying, freeze-drying with upstream or downstream granulation, or spray-freeze drying, build-up granulation, for example by the plate or drum granulation process, optionally with partially predried product, fluidized-bed drying and granulation, mixer agglomeration, and mixer drying, if appropriate in combination with fluidized-bed or fluid-bed drying. Methods such as mix-agglomeration in suspension, if appropriate with downstream fluidized-bed or fluid-bed drying, granulation by means of paste-forming with downstream after drying, and comminution or pelleting and steam-jet agglomeration, are also suitable. Combinations of the abovementioned processes are also possible.

Especially preferred are the processes of spray-drying by means of high-pressure or spiral chamber nozzles, spray-drying with integrated or downstream fluidized-bed agglomeration and/or drying, build-up granulation by the plate process, or fluidized-bed granulation and drying.

The solid pigment preparations prepared by these processes have, in particular, a water content of less than 10% by weight (preferably less than 3% by weight) and a mean particle size of 20 to 2000 $\mu$m (preferably 50 to 1000 $\mu$m and in particular 80 to 500 $\mu$m). The solid pigment preparations are based in particular on a spherical or sphere-like particle structure.

Due to their composition and good redispersibility, the solid pigment preparations described above are particularly suitable for coloring seed and water-based seed-dressing products and yield the highest possible color or pigment yield. Due to the high pure pigment contents of preferably over 60% by weight, deeper colors can be obtained without undesired dilution of the seed-dressing products by added water, in contrast to pigementations with aqueous fluid preparations with lower pigment concentrations. In contrast to pigment powders also employed in practice, the solid pigment preparations to be used in accordance with the invention are dust-free, outstandingly flowable, readily meterable, and markedly stronger in color, based on the pure pigment content.

The use of the solid pigment preparations for coloring seed or seed-dressing materials can be effected in any desired manner, for example by mixing the solid pigment preparation with water, if appropriate, simultaneously or in succession with pesticides and optionally other additives, and stirring the resulting slurry treatment materials with the seed in suitable apparatuses.

Suitable pesticides which may be mentioned are, for example, the compounds mentioned in WO-A 95 31 889 (page 3, line 13 to page 6, line 13), which are also considered part of the present application.

The following examples further illustrate details for the preparation and use of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all percentages are percentages by weight.

EXAMPLES

Example 1

Solid Pigment Preparation Based on Pigment of Colour Index Pigment White 6

25.4 parts of fully demineralized water were introduced into a dissolver, and 6 parts of a reaction product of hydrogenated castor oil and 60 molar units ethylene oxide (component (b)), 0.5 part of triethanolamine (pH regulator), 0.1 part of Surfynol® DF62 (antifoam by Air Products, based on silicone oil), and 68 parts of Kronos® 1001 (pigment of component (a), Colour Index Pigment White 6, anatase-type titanium dioxide pigment by Kronos) were mixed in completely at low speed and the suspension was subsequently homogenized over 22 minutes at a circumferential speed of 22 m/s.

After the suspension had been brought to a solid content of 45% by weight with more water, it was dried under the following conditions in a "single-material nozzle drier" to give granules:

| | |
|---|---|
| Nozzle: | Spiral chamber nozzle, model diameter 1.4 mm |
| Nozzle pressure: | 26 bar |
| Nozzle throughput: | 157 kg/h |
| Air inlet temperature: | 220° C. |
| Air outlet temperature: | 82° C. |

This gave dust-free, highly flowable granules with a mean particle size (ex mass distribution) of approx. 160 μm having the following (approximate) composition:

90% of Pigment White 6 (pigment of component (a))

8% of compound of component (b)

0.6% of triethanolamine 0.1% of Surfynol® DF62

1.3% of residual moisture (water)

This white solid pigment preparation was highly redispersible in water-based seed-dressing products of known pesticides and produced white pigmentations of the seed-dressing product with an outstanding hiding power.

The seed of sugar beet was encrusted with a seed-dressing product comprising

50% of water 7.5% of a customary insecticide/fungicide mixture,

35% of customary mineral additives, and 7.5% of the above pigment preparation in a rotating container by known methods and-then dried.

This gave a white pigmentation that adhered outstandingly to the seed.

Example 2

Solid Pigment Preparation Based on Pigment of Colour Index Pigment Red 101

40.6 parts of fully demineralized water were introduced into a dissolver, and 4.2 parts of a reaction product of hydrogenated castor oil and 40 molar units of ethylene oxide (component (b)), 0.2 part of Surfynol® DF62 (antifoam by Air Products, based on silicone oil), and 55 parts of Bayferrox® Rot 130M (pigment of component (a), Colour Index Pigment Red 101, Bayer AG) were mixed in completely at low speed, the pH was brought to 8 using dilute sodium hydroxide solution, and the suspension was subsequently homogenized over 30 minutes at a circumferential speed of 18 m/s.

After the suspension had been brought to a solid content of 40% by weight with more water, it was dried under the following conditions in a "single-material nozzle drier" to give granules:

| | |
|---|---|
| Nozzle: | Spiral chamber nozzle, model diameter 1.4 mm |
| Nozzle pressure: | 29 bar |
| Nozzle throughput: | 107 kg/h |
| Air inlet temperature: | 180° C. |
| Air outlet temperature: | 79° C. |

This gave dust-free, highly flowable granules with a mean particle size (ex mass distribution) of approx. 180 μm having the following (approximate) composition:

91% of Pigment Red 101 (pigment of component (a))

6.9% of compound of component (b)

0.2% of Surfynol® DF62

1.9% of residual moisture (water)

This red solid pigment preparation was highly redispersible in water-based seed-dressing products and showed outstanding compatibility in various seed-dressing products.

The seed of sugar beet was treated as described in Example 1 with a seed-dressing product comprising 59% of water 4% of a customary insecticide/fungicide mixture, 35% of customary mineral additives, 2% of the above solid pigment preparation, which gave a uniform red pigmentation that adhered well to the seed.

Example 3

Solid Pigment Preparation Based on Pigment of Colour Index Pigment Red 48:2

15 parts of fully demineralized water were introduced into a rapid stirrer, and 2.9 parts of a reaction product of hydrogenated castor oil and 30 molar units of ethylene oxide (component (b), Emulgator® KS, Bayer AG), and 9 parts of Solfort® Red 2B (pigment of component (a), Colour Index Pigment Red 48:2, Bayer AG) were introduced completely at low speed, the pH was brought to 7.2 using dilute sulfuric acid, and the suspension was homogenized completely.

This was followed by grinding in 3 passages in a closed horizontal bead mill Molinex®, type LME, by Netzsch using 0.4 to 0.6 mm glass beads, a milling space fill level of 70%, a circumferential speed of the disc stirrer of 12 m/s, and a ratio of mill base throughput (I/h) to milling volume (I) of 2.5. After the solids content had been brought to approx. 30% by weight with more water, the suspension was dried under the following conditions on a "single-material nozzle" drier to give granules:

| | |
|---|---|
| Nozzle: | Spiral chamber nozzle, model diameter 1.09 mm |
| Nozzle pressure: | 28 bar |
| Nozzle throughput: | 87 kg/h |
| Air inlet temperature: | 160° C. |
| Air outlet temperature: | 70° C. |

This gave dust-free, highly flowable granules with a mean particle size (ex mass distribution) of approx. 210 μm having the following (approximate) composition:

73.8% of C.I. Pigment Red 48:2 (pigment of component (a))

23.6% of compound of component (b)

2.6% of residual moisture (water)

This red solid pigment preparation was highly redispersible in water-based seed-dressing products and showed outstanding compatibility in various seed-dressing products.

A seed-dressing gel was produced by the same method as described in WO-A 95/31889, Ex. 8, except for exchanging 1 part of C.I. Pigment Red 57:1 for 0.5 part of the above solid pigment preparation, and applied to wheat seed in a seed-dressing drum using customary methods. The seed-dressing gel itself and the coating on the surface of the seed showed a strong and uniform, in particular streak-free, coloration. If the conditions remained identical except for using a powder pigment of C.I. Pigment Rot 48:2 (Sofort® Red 2B) instead of the solid pigment preparation, the coloration of the gel was markedly less strong and showed streaks.

Example 4

Solid Pigment Preparation Based on Pigment of Colour Index Pigment Blue 15:1

54 parts of fully demineralized water were introduced into a rapid stirrer, and 21 parts of a reaction product of hydrogenated castor oil and 30 molar units of ethylene oxide (component (b), Emulgator® KS, Bayer AG), 0.7 part of Aerosil®200 (pyrogenic silica of component (c), Degussa-Hüls AG), and 68 parts of Heliogenblau® L 6905 F (pigment of component (a), Colour Index Pigment Blue 15:1, BASF AG) were introduced completely at low speed, the pH was brought to 7.3 using dilute sodium hydroxide solution, and the suspension was homogenized completely.

This was followed by grinding in 2 passages in a closed horizontal bead mill Molinex®, type LME, by Netzsch using 0.4 to 0.6 mm glass beads, a milling space fill level of 70%, a circumferential speed of the disc stirrer of 12 m/s, and a ratio of mill base throughput (I/h) to milling volume (I) of 3. After the solids content had been brought to approx. 34% by weight with more water, the suspension was dried under the following conditions on a "single-material nozzle" drier to give granules:

| | |
|---|---|
| Nozzle: | Spiral chamber nozzle, model diameter 1.09 mm |
| Nozzle pressure: | 28 bar |
| Nozzle throughput: | 95 kg/h |
| Air inlet temperature: | 180° C. |
| Air outlet temperature: | 75° C. |

This gave dust-free, highly flowable granules with a mean particle size (ex mass distribution) of approx. 180 μm having the following (approximate) composition:

75.1% of C.I. Pigment Blue 15:1 (pigment of component (a))

23.1% of compound of component (b)

0.8% of pyrogenic silica (component (c))

1.0% of residual moisture (water)

This blue solid pigment preparation was highly redispersible in water-based seed-dressing products and showed outstanding compatibility in various seed-dressing products.

What is claimed is:

1. A method comprising coloring seed, seed-dressing materials, or seed-dressing material formulations with a solid pigment preparation comprising
    (a) at least one organic or inorganic pigment and
    (b) at least one compound selected from the group consisting of polyether polyols, reaction products of alkylene oxides with alkylatable compounds, or oxalkylated phenols,
wherein the solid pigment preparation has a water content of less than 10% by weight, based on the pigment preparation, and a mean weight average particle size of 20 to 2000 μm.

2. A method according to claim 1 wherein the pigment of component (a) is
    (i) an inorganic oxide pigment,
    (ii) an organic pigment, or
    (iii) or a mixture thereof.

3. A method according to claim 1 wherein the pigment of component (a) is titanium dioxide, an iron oxide pigment, a phthalocyanine pigment, an anthraquinone pigment, or a laked azo pigment.

4. A method according to claim 1 wherein the pigment of component (a) is an optionally halogenated Cu-phthalocyanine pigment or a laked metal salt of a sulfo- and/or carboxyl-containing monoazo pigment.

5. A method according to claim 1 wherein the solid pigment preparation additionally comprises
    (c) an optionally hydrophobicized highly-dispersed amorphous pyrogenic silica, an optionally hydrophobicized ultrafinely divided kaolin, a highly dispersed alumina, or a mixture thereof.

6. A solid pigment preparation comprising
    (a) at least one organic or inorganic pigment and
    (b) at least one compound selected from the group consisting of polyether polyols, reaction products of alkylene oxides with alkylatable compounds, or oxalkylated phenols,
wherein the solid pigment preparation has a water content of less than 10% by weight, based on the pigment preparation, and a mean weight average particle size of 20 to 2000 μm and
    (c) an optionally hydrophobicized highly-dispersed amorphous pyrogenic silica, an optionally hydrophobicized ultrafinely divided kaolin, a highly dispersed alumina, or a mixture thereof.

* * * * *